US009133858B2

(12) United States Patent
Macchia et al.

(10) Patent No.: US 9,133,858 B2
(45) Date of Patent: Sep. 15, 2015

(54) DIFFUSER CASE REMOVAL APPARATUS AND METHOD

(71) Applicant: Pratt & Whitney Canada Corp., Longueuil (CA)

(72) Inventors: Enzo Macchia, Kleinburg (CA); Geoffrey Henriksen, Mississauga (CA); Robin Hardstaff, Georgetown (CA); Ian Chandler, Georgetown (CA); Tim Bedard, East Hampton, CT (US)

(73) Assignee: PRATT & WHITNEY CANADA CORP., Longueuil (CA)

( * ) Notice: Subject to any disclaimer, the term of this patent is extended or adjusted under 35 U.S.C. 154(b) by 171 days.

(21) Appl. No.: 13/921,490

(22) Filed: Jun. 19, 2013

(65) Prior Publication Data

US 2013/0276285 A1 Oct. 24, 2013

Related U.S. Application Data

(62) Division of application No. 12/257,410, filed on Oct. 24, 2008, now Pat. No. 8,528,176.

(51) Int. Cl.

| | |
|---|---|
| ***B23P 19/04*** | (2006.01) |
| ***F04D 29/44*** | (2006.01) |
| ***F01D 25/28*** | (2006.01) |
| ***F04D 1/14*** | (2006.01) |
| ***F04D 7/06*** | (2006.01) |

(52) U.S. Cl.

CPC .............. *F04D 29/44* (2013.01); *F01D 25/285* (2013.01); *F04D 1/14* (2013.01); *F04D 7/065* (2013.01); *F04D 29/445* (2013.01); *F05D 2230/80* (2013.01); *F05D 2260/37* (2013.01); *Y10T 29/49822* (2015.01); *Y10T 29/53796* (2015.01); *Y10T 29/53843* (2015.01); *Y10T 29/53852* (2015.01); *Y10T 29/53861* (2015.01); *Y10T 29/53878* (2015.01); *Y10T 29/53909* (2015.01); *Y10T 29/53943* (2015.01)

(58) Field of Classification Search

USPC ............ 29/259, 255, 244, 257, 263, 270, 278

See application file for complete search history.

(56) References Cited

U.S. PATENT DOCUMENTS

| | | | |
|---|---|---|---|
| 3,997,962 | A | 12/1976 | Kleitz et al. |
| 4,007,535 | A | 2/1977 | Brandt et al. |

(Continued)

OTHER PUBLICATIONS

Canadian Intellectual Property Office; Examiner's Requisition dated Apr. 10, 2012 in relation to Canadian Patent Application No. 2,673,139.

(Continued)

*Primary Examiner* — Lee D Wilson
*Assistant Examiner* — Nirvana Deonauth
(74) *Attorney, Agent, or Firm* — Norton Rose Fulbright Canada LLP

(57) ABSTRACT

A method and apparatus is provided for removing a centrifugal compressor diffuser case from a turbofan gas turbine engine case which may be used while the engine is installed on an aircraft or when the engine has been removed from the aircraft. The tool includes movable gripping members at least one force member for exerting a pushing action on the engine structure on which the diffuser case is mounted the method includes gripping a peripheral portion of the diffuser case and applying an axial pushing force on the case relative to the engine case to thereby overcome an interference fit between the diffuser case and the engine case.

14 Claims, 6 Drawing Sheets

(56) References Cited

U.S. PATENT DOCUMENTS

| | | | | |
|---|---|---|---|---|
| 4,031,603 | A | 6/1977 | Shultz | |
| 4,451,979 | A | 6/1984 | Schuster | |
| 4,685,286 | A | 8/1987 | Hetzer et al. | |
| 4,870,741 | A | 10/1989 | Hansmann | |
| 5,035,379 | A | 7/1991 | Hersen et al. | |
| 5,220,784 | A | 6/1993 | Wilcox | |
| 5,267,397 | A | 12/1993 | Wilcox | |
| 5,575,145 | A | 11/1996 | O'Neill et al. | |
| 5,609,313 | A | 3/1997 | Cole et al. | |
| 6,126,113 | A | 10/2000 | Navickas | |
| 6,189,211 | B1 | 2/2001 | Suter | |
| 6,340,135 | B1 | 1/2002 | Barton | |
| 6,601,278 | B2 | 8/2003 | Koppe | |
| 6,606,863 | B2 | 8/2003 | Napier | |
| 7,032,279 | B2 | 4/2006 | McCarvill et al. | |
| 7,338,101 | B2 | 3/2008 | Quiroz | |
| 2003/0147742 | A1 * | 8/2003 | Thomas | 415/133 |
| 2005/0005413 | A1 | 1/2005 | Smith | |

OTHER PUBLICATIONS

United States Patent and Trade-mark Office; Office Action dated Aug. 18, 2011 in relation to U.S. Appl. No. 12/257,410.

United States Patent and Trade-mark Office; Response dated Sep. 12, 2011 to Office Action dated Aug. 18, 2011 in relation to U.S. Appl. No. 12/257,410.

United States Patent and Trade-mark Office; Office Action dated Apr. 10, 2012 in relation to U.S. Appl. No. 12/257,410.

United States Patent and Trade-mark Office; Response dated Jul. 10, 2012 to Office Action dated Apr. 10, 2012 in relation to U.S. Appl. No. 12/257,410.

United States Patent and Trade-mark Office; Office Action dated Sep. 13, 2012 in relation to U.S. Appl. No. 12/257,410.

United States Patent and Trade-mark Office; Response dated Dec. 12, 2012 to Office Action dated Sep. 13, 2012 in relation to U.S. Appl. No. 12/257,410.

United States Patent and Trade-mark Office; Notice of Allowance dated Mar. 20, 2013 in relation to U.S. Appl. No. 12/257,410.

Canadian Intellectual Property Office; Response dated Oct. 5, 2012 to Examiner's Requisition dated Apr. 10, 2012 in relation to Canadian Patent Application No. 2,673,139.

Canadian Intellectual Property Office; Examiner's Requisition dated Jun. 7, 2011 in relation to Canadian Patent Application No. 2,673,139.

Canadian Intellectual Property Office; Response dated Dec. 6, 2011 to Examiner's Requisition dated Jun. 7, 2011 in relation to Canadian Patent Application No. 2,673,139.

Canadian Intellectual Property Office; Notice of Allowance dated Jan. 16, 2013 in relation to Canadian Patent Application No. 2,673,139.

* cited by examiner

DIFFUSER CASE REMOVAL APPARATUS AND METHOD

CROSS-REFERENCE TO RELATED APPLICATION AND CLAIM OF PRIORITY

The present application is a divisional of U.S. patent application Ser. No. 12/257,410, filed Oct. 24, 2008, the entire contents of which are hereby incorporated by reference.

TECHNICAL FIELD

The application relates generally to centrifugal compressor diffuser cases for gas turbine engines and, more particularly, to removal of such diffuser cases from the gas turbine engine.

BACKGROUND OF THE ART

The removal of a diffuser case from a gas turbine engine is usually an operation that necessitates that the engine be removed from the aircraft and brought to a maintenance facility where the diffuser case can be detached from the remainder of the engine case, so necessary repairs and/or maintenance may be performed. The shop setting is required typically because tools such as overhead hoists and/or hydraulic cylinders are required to remove the diffuser case form the engine, such as during an engine overhaul. Removal of the engine from the aircraft is a generally costly and lengthy procedure, thus increasing the cost and time of any repair and/or maintenance of the diffuser, compressor components or any other part of the engine accessed through removal of the diffuser case, especially where such repair/maintenance could otherwise be performed while the engine is still "on-wing". In any event, regardless of whether the engine is on-wing or not, there also remains a need for improved approaches to diffuser case removal.

SUMMARY

In one aspect, there is provided a diffuser case puller for removing a centrifugal compressor diffuser case from circumferential flange of a turbofan gas turbine engine case on which the diffuser case is mounted, the diffuser case having first and second exposed radially-extending surfaces about a periphery of the diffuser case, the first and second exposed surfaces being axially substantially parallel to and spaced apart from one another and the circumferential flange, the engine defining axial and radial directions about a central axis of rotation, the diffuser case puller comprising a base member having a contact surface configured to bear against the first exposed surface of the diffuser case, positioning members extending from the base member in a direction substantially normal to the contact surface for positioning the diffuser case puller in a predetermined axial position with respect to the diffuser case, gripping members connected to the base member and each having a gripping surface extended substantially parallel to but spaced-apart from the contact surface of the base member, the gripping surface of the gripping members selectively axially movable with respect to the contact surface of the base member, the gripping surface of the gripping members configured to engage the second exposed surface of the diffuser case, the contact surface of the base member and the movable gripping surface of the gripping members forming a jaw to grippingly receive the first and second exposed surfaces of the diffuser case therebetween, the diffuser case puller further comprising a force member mounted to the base member and extending substantially normal to the contact surface of the base member, the force member axially movable relative to the contact surface of the base member, the force member moveable to "pushingingly" engage the flange and to apply an axial pushing force between the flange and at least one of the contact surface and the gripping surface, at least one of the contact surface and the gripping surface transmitting the pushing force to the diffuser to thereby permit the diffuser case puller to apply said pushing force between the flange and the diffuser case for removal of the diffuser case from the flange.

In another aspect, there is provided a method of removing a centrifugal compressor diffuser case from a circumferential flange of a turbofan gas turbine engine case in which the diffuser case is mounted with an interference fit, the method comprising: removing at least one fastener connecting the diffuser case to the flange so that substantially only the interference fit joins the diffuser case to the flange; installing a plurality of tools around a periphery of the diffuser case; gripping a portion of the diffuser case with each of the tools; and then pushing axially against the flange in a concerted fashion with each of the tools with sufficient force to overcome the interference fit between the diffuser case and the flange and thereby axially move the diffuser case away from flange.

In a further aspect, there is provided a method of detaching a centrifugal compressor diffuser case from a turbofan gas turbine engine case in which the diffuser case is inserted with an interference fit, the method comprising: exposing the diffuser case while the gas turbine engine is attached to an aircraft, including removing through an aft portion of the engine case portions of the gas turbine engine located axially rearwardly of the diffuser case to thereby provide access to the diffuser case; removing at least one fastener connecting the diffuser case to the engine case so that substantially only the interference fit joins the diffuser case to the engine case; installing a plurality of tools around a periphery of the diffuser case; gripping a portion of the diffuser case with each of the tools; and then pushing axially against the engine case in a concerted fashion with each of the tools with sufficient force to overcome the interference fit between the diffuser case and the engine case and thereby axially move the diffuser case away from engine case.

DESCRIPTION OF THE DRAWINGS

Reference is now made to the accompanying figures in which.

DETAILED DESCRIPTION

Figure 1:
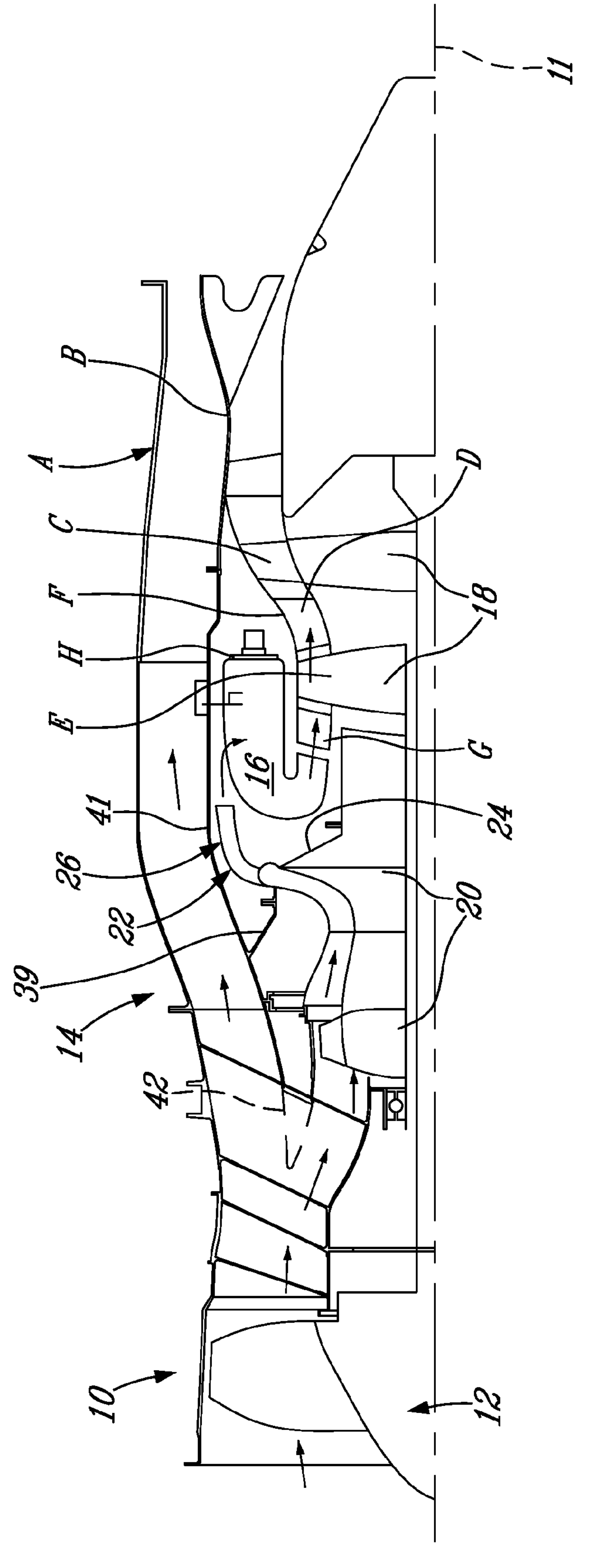
FIG. 1 is a schematic cross-sectional view of a gas turbine engine having a diffuser case.

FIG. 1 illustrates a turbofan gas turbine engine 10 of a type preferably provided for use in subsonic flight, such as a Pratt & Whitney Canada PW600 family turbofan engine. The engine 10 generally comprises, in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The combustion gases are thereafter exhausted to the atmosphere through an exhaust case B.

The compressor section 14 may include a centrifugal compressor assembly 20 and a corresponding diffuser 22. The air compressed by the compressor assembly 20 flows through the diffuser 22 before entering the combustor 16. The diffuser 22 extends radially outwardly of the compressor assembly 20 and generally comprises a diffuser case 24 surrounding the compressor assembly 20 and receiving high velocity airflow therefrom, and a series of diffuser pipes 26 in communication with the diffuser case 24 and directing the air flow toward the combustor 16. The diffuser 22 converts the high velocity air flow into a high pressure air flow, i.e. slows and pressurizes the air flow coming out of the compressor assembly 20.

The diffuser case 24 is generally attached to the outer case 41 of the engine 10 through an interference fit with a stationary structural flange of the gas generator case 41 by removable fasteners such as bolts, as will be described further below.

In the present specification, the words "axial", "radial" and "circumferential" are used to describe orientation with respect to a central axis of the gas turbine engine 10, which is schematically shown at 11 in FIG. 1.

Figure 4:
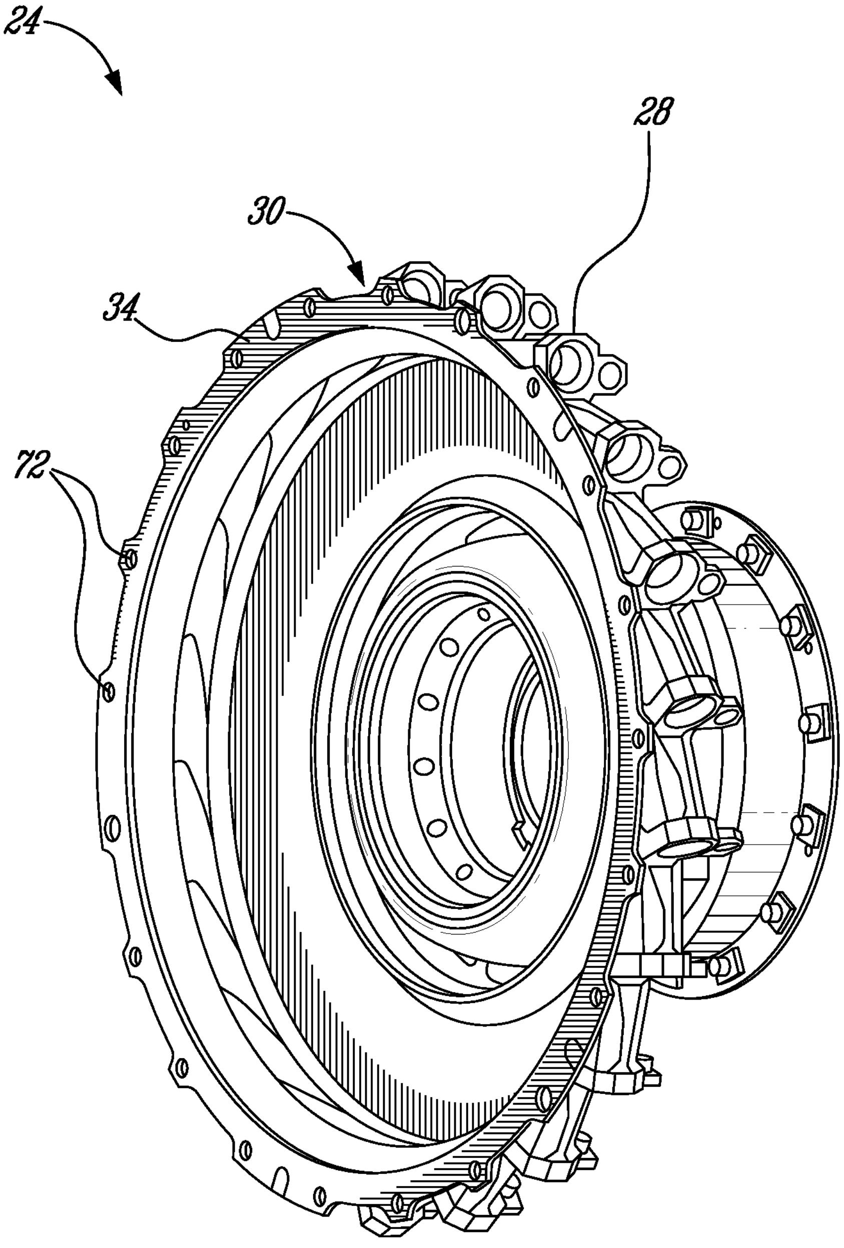
FIG. 4 is an isometric view of the diffuser case removed form the engine of FIG. 1.
Figure 5:
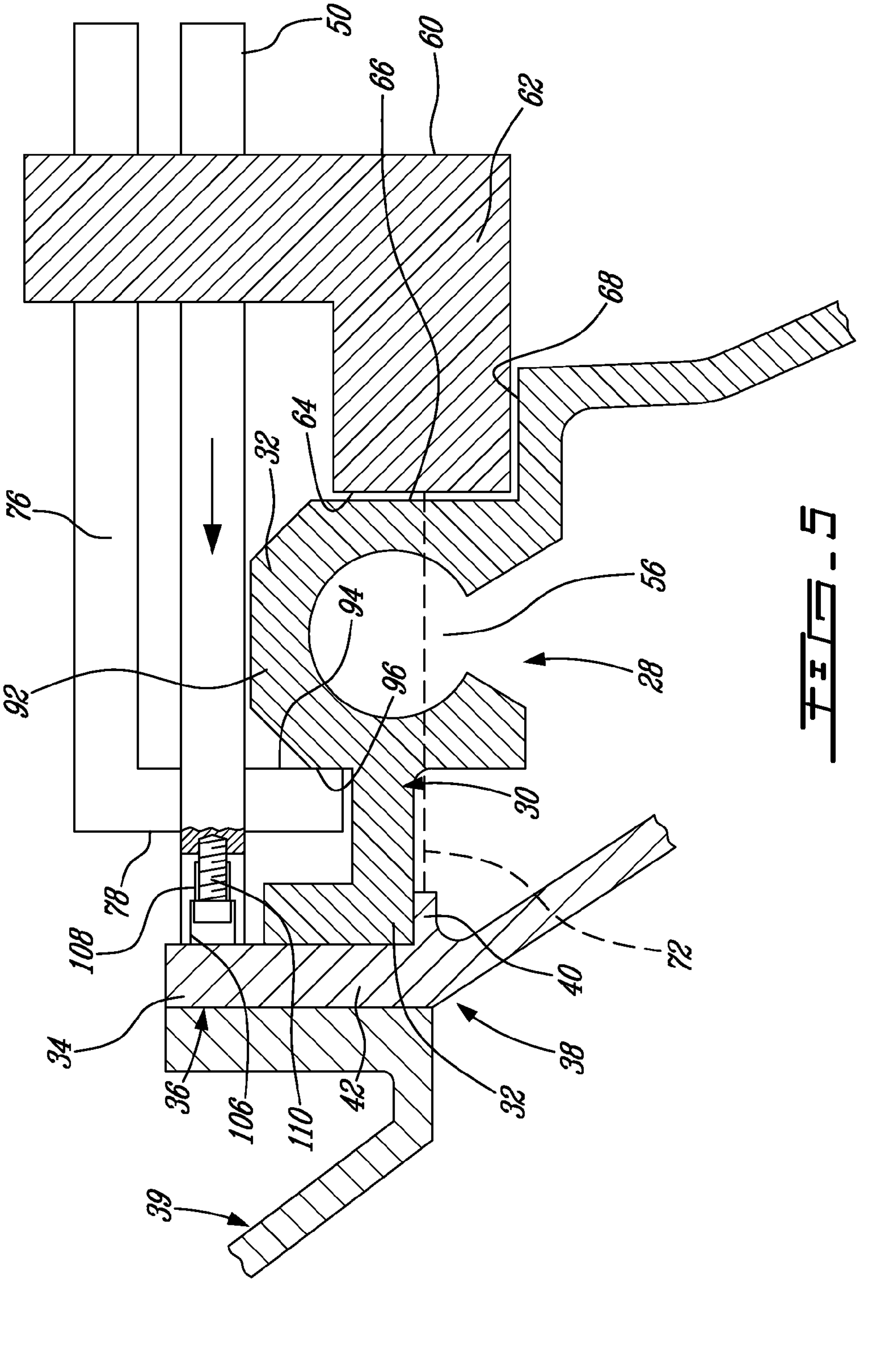
FIG. 5 is a vertical simplified cross-sectional view, taken along the line 5-5 in FIG. 2, of the tool of FIG. 2 installed on the engine of FIG. 1.

Referring to FIGS. 4 and 5, the diffuser case 24 includes a diffuser ring 28 and an annular flange 30 extending therefrom, the annular flange 30 having an axial portion 32 and a radial portion 34 connected thereto, thus defining an L-shaped cross-section. The centrifugal compressor assembly 20 includes an outer shroud 36 also having an annular flange 38 with an axial portion 40 and a radial portion 42 connected thereto to define an L-shaped cross-section. The axial portion 32 of the annular flange 30 of the diffuser case 24 surrounds the axial portion 40 of the flange 38 of the outer shroud 36 with an interference fit. The radial portion 34 of the flange 30 of the diffuser case 24 is in axial abutment with the radial portion 42 of the flange 38 of the outer shroud 36 and attached thereto through a plurality of fasteners (not shown) inserted through holes 72 (FIG. 4) through in the flange 30, which also extend through a radial portion 39 of a flange connected to the outer case 41 surrounding the diffuser case 24. In the example shown, the outer case 41 includes an intermediate case and a gas generator case of the engine 10, formed as a single integral case (see also FIG. 1). However the exact engine configuration as well as the exact mode of attachment of the diffuser case 24 to the case turbine engine 10, including the portion of the engine 10 the diffuser case 24 is attached to, can be varied.

Once the fasteners are removed, the friction force caused by the interference fit must be overcome to detach the diffuser case 24 from the remainder of the gas turbine engine 10.

Figure 2:
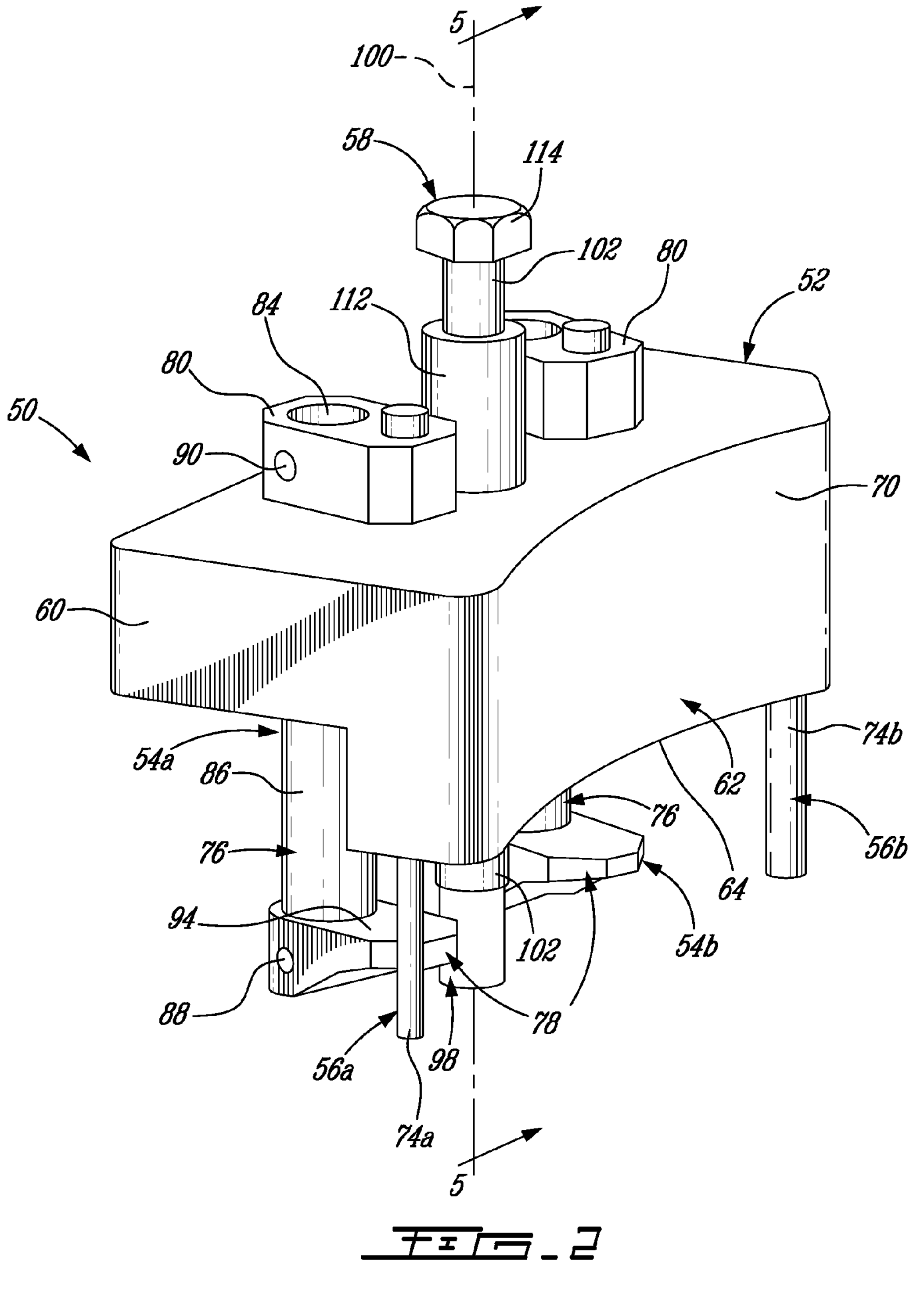
FIG. 2 is a perspective view of a tool that can be used to remove a diffuser case from the engine shown in FIG. 1.

FIG. 2 illustrates an example of a diffuser case puller or tool 50 for removing the diffuser case 24 from the engine. The tool 50 generally includes a base member 52 to which are attached two gripping members 54*a*, 54*b*, two positioning members 56*a*, 56*b* and a force member 58. The number of gripping members, positioning members and force members can be varied according to the design of the particular diffuser case 24 to be removed.

Referring to FIGS. 2-5, the base member 52 includes a platform portion 60 and a contact portion 62 extending therefrom. The contact portion 62 includes at least one contact surface 64 shaped to abut a corresponding selected exposed supporting surface 66 of the diffuser case 24, and is shaped to remain clear of any non-supporting surfaces thereof. In the example shown, the supporting surface 66 of the diffuser case 24 is a radial or substantially radial annular rearwardly facing surface of the diffuser ring 28. The contact surface 64 of the contact portion 62 is an arcuate flat surface which is shaped for uniform abutment with supporting surface 66 of the diffuser case 24. In the example shown, the non-supporting surfaces of the diffuser case include an axial or substantially axial annular surface 68 of the diffuser case 24 extending rearwardly from the supporting surface 66. The contact portion 62 of the tool 50 thus includes a concave surface 70 extending perpendicularly or substantially perpendicularly from the contact surface 64, the concave surface 70 being shaped to extend in a parallel and close facing relationship with the nearby annular non-supporting surface 68 when the tool 50 is in use.

The shape of the base member 52, and particularly of the contact portion 62 thereof, will thus vary according to the design of the particular diffuser case 24 to be removed and according to the selected supporting surface(s) 66 of the diffuser case 24.

Figure 3:
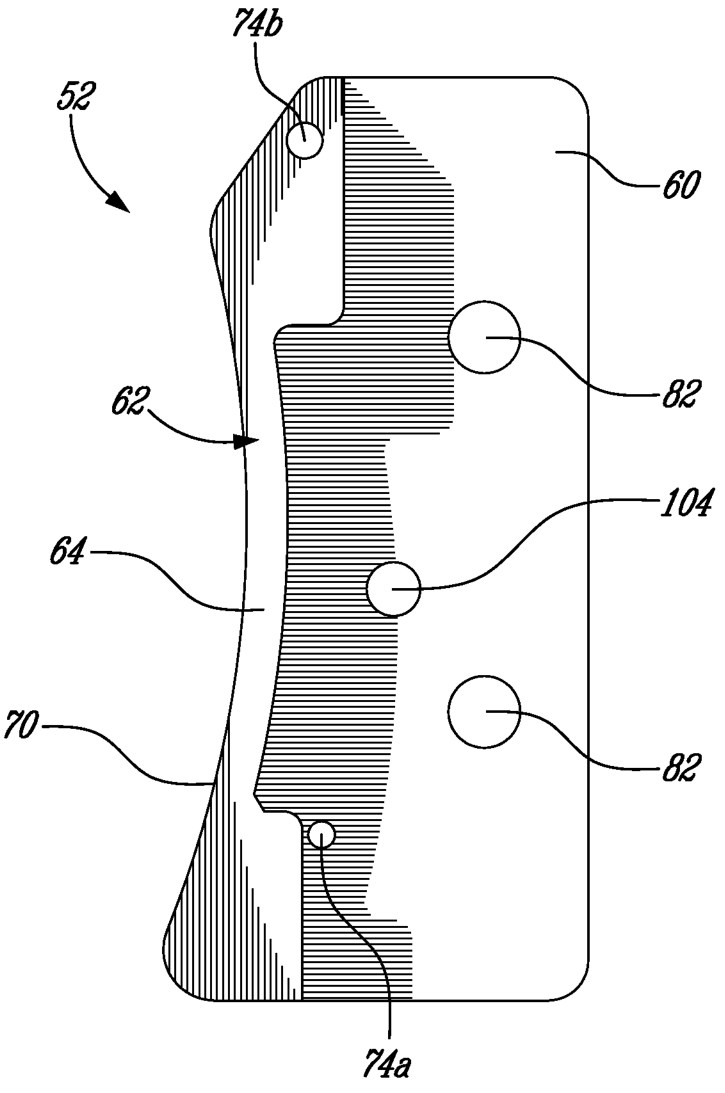
FIG. 3 is a bottom view of a base member of the tool of FIG. 2.

Referring to FIG. 2, each positioning member 56*a*, 56*b* is shaped for engagement with engaging elements 72 (FIGS. 4 and 5) of the diffuser case 24 and/or of the remainder of the gas turbine engine 10. In the example shown, and referring to FIG. 5, the engaging elements 72 include respective aligned holes already defined in the radial portions 34, 42 of the flanges 30, 38 of the diffuser case 24 and compressor outer shroud 36, such as for example fastener holes from which the fasteners have been removed. Referring to FIGS. 2-3, the positioning members 56*a*, 56*b* thus each include a cylindrical pin 74*a*, 74*b* extending from the base member 52 in a direction away from and normal or substantially normal to the contact surface 64. The first cylindrical pin 74*a* has a smaller diameter and extends from the platform portion 60 of the base member 52 in proximity of the contact portion 62 thereof. The second cylindrical pin 74*b* has a larger diameter and extends from the contact portion 62. The position and size of the cylindrical pins 74*a*, 74*b* is selected such that each pin 74*a*, 74*b* can be received in the selected engaging element 72. The positioning members 56*a*, 56*b* thus provide for proper positioning of the tool 50 both prior and during its use, and as such also serve as guides during use.

The configuration and location of each positioning member 56*a*, 56*b* will thus vary according to the design of the particular diffuser case 24 to be removed and according to the selected engaging elements 72 of the diffuser case 24 and/or the remainder of the gas turbine engine 10.

Each gripping member 54*a*, 54*b* is movable to and away from a gripping position with respect to the base member 52. Referring to FIG. 2, the gripping member 54*a*, 54*b* of the tool 50 shown are identical to one another, and each include a pivot rod 76, a finger portion 78 and a knob 80. Each pivot rod 76 includes a first section 84 having a smaller diameter which is pivotally received in a respective hole 82 defined in the platform portion 60 of the base member 52 (see FIG. 3). The pivot rod 76 also includes a second section 86 extending from the first section 84 and having a larger diameter than the base member hole 82, with the finger portion 78 being connected at the free end of the second section 86. The knob 80 is connected to the free end of the first section 84. As such, the enlarged diameter of the second section 86 on one side of the base member 52 and the presence of the knob 80 on the other side of the base member 52 prevent the pivot rod 76 from sliding within the base member hole 82, thus keeping a distance between the base member 52 and the finger portion 78 constant.

The knob 80, pivot rod 76 and finger portion 78 are connected such as to pivot together, for example by having a first connecting pin 88 extending through the finger portion 78 and pivot rod 76 and a second connecting pin 90 extending through the knob 80 and pivot rod 76. The gripping members 54*a*, 54*b* thus pivot between a gripping position, shown in FIG. 5, and a release position where the finger portions 78 are pivoted away from the diffuser case 24 to allow installation or removal of the tool 50.

The shape of the finger portion 78 and the distance between the finger portion 78 and the base member 52 is selected according to the shape and dimension of a gripped portion 92 of the diffuser case 24 to be received between the finger portions 78 and the base member 52. In the example shown and referring to FIG. 5, the gripped portion 92 of the diffuser case 24 includes the diffuser ring 28. The finger portions 78 have a triangular profile and include a flat gripping surface 94 facing the base member 52, and the distance between the finger portion 78 and the contact surface 64 of the base member 52 is selected such that the contact surface 64 of the base member 52 can abut the supporting surface 66 while the gripping surface 94 of the finger portion 78 is in contact with a radial or substantially radial surface 96 of the diffuser ring 28 opposed to the supporting surface 66. The contact surface 64 and the finger portions 78 define a jaw-like structure adapted to receive the diffuser case in a relatively tight fit manner to prevent tilting of the tool in respond of the pushing action of the force member 58 on the structure behind the diffuser ring, i.e. the compressor outer shroud 36.

The configuration of the gripping members 54*a*, 54*b* and particularly the shape of the finger portion 78 and the distance between the finger portion 78 and the contact surface 64 of the base member 52 will thus vary according to the design of the particular diffuser case 24 to be removed and according to the selected gripped portion 92 of the diffuser case 24.

Referring back to FIG. 2, the force member 58 includes a foot portion 98 which is movable relative to the base member 52 upon actuation of the force member 58. The connection between the force member 58 and the base member 52 transforms the pushing force applied along the longitudinal direction 100 by the foot portion 98 against a surface of the gas turbine engine 10 into an opposite pulling force applied by the gripping members 54*a*, 54*b* to the diffuser case 24. The force member 58 of the tool 50 shown includes a threaded rod 102, for example a hexagonal bolt, engaged in a threaded hole 104 (see FIG. 3) of the base member 52 with the longitudinal direction 100 of the threaded rod 102 extending perpendicularly or substantially perpendicularly to the contact surface 64 of the base member 52. Referring to FIG. 5, the foot portion 98 supported by the threaded rod 102 can be provided in the form of a cylindrical sleeve having a bore 106 defined therethrough along its longitudinal axis, the bore 106 defining a shoulder 108 therewithin. The foot portion 98 is mounted to the free end of the threaded rod 102 with an axially extending fastener 110, such as for example a screw, passing through the bore 106 and having a head cooperating with the shoulder 108 to axially retain the foot portion on the rod 102 while allowing pivotal movement of the foot portion 98 about the axis of the rod 102. This prevent damaging the surface of the outer shroud upon which the foot portion 98 rests when a torque is applied on the rod 102 to push on the outer shroud in order to pull out the diffuser case 24. Referring back to FIG. 2, the force member 58 further includes a cylindrical sleeve 112 surrounding the threaded rod 102 between the head 114 thereof and the base member 52. The sleeve 112 is sized such as to prevent the head 114 of the threaded rod 102 from passing therethrough. As such the sleeve 112 limits the movement of the foot portion 98 away from the base member 52 to a desired range selected according to the necessary motion of the foot portion 98 for separating the diffuser case 24 from the gas turbine engine 10.

The size and shape of the foot portion 98 and the position of the force member 58 with respect to the base member 52 is selected such that in use, with the positioning members 56*a*, 56*b* in engagement with the diffuser case 24 and/or the gas turbine engine 10, the foot portion 98 can rest against a radial or substantially radial receiving surface 116 of the gas turbine engine, whether by going through a hole in the diffuser case 24 or by extending alongside it, to apply a force against that receiving surface 116 located behind the diffuser case 24. In the example shown, the threaded rod 102 is received in the base member 52 in an offset position with respect to a center thereof, in the threaded hole 104 shown in FIG. 3. Referring to FIG. 5, the receiving surface 116 is a rearwardly facing surface of the radial portion 42 of the annular flange 38 of the outer shroud 36. The foot portion 98 rests against the receiving surface 116 within an indentation 118 defined in the radial portion 34 of the annular flange 30 of the diffuser case 24.

The size, shape and location of the force member 58, and in particular the size and shape of the foot portion 98, will thus vary according to the design of the particular diffuser case 24 to be removed and according to the selected receiving surface of the diffuser case 24.

Where it is desired to remove the diffuser case form the engine, for example to provide access to centrifugal compressor assembly 20 to conduct maintenance, repair or overhaul type activities on the engine, access may be gained through the rear end of the engine. The tool 50 can be used to detach the diffuser case 24 from the gas turbine engine 10 in accordance with the following and referring to FIG. 5. As the skilled reader will appreciate, however, that access to the diffuser case will typically first require removal of various engine assemblies depending on engine model, an example of such removal which will now be briefly described.

Figure 6:
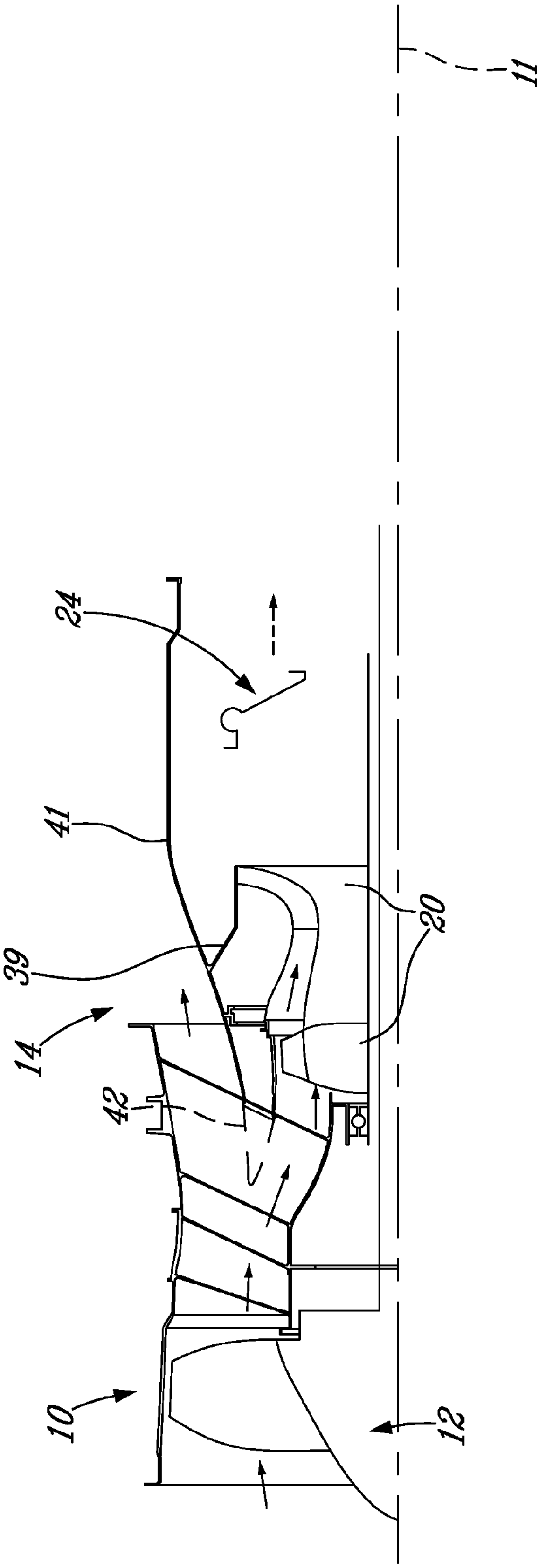
FIG. 6 is a view similar to FIG. 1, with portions of the engine removed to gain access to a diffuser case thereof, and showing the tool of FIG. 2 installed on the engine.

First, and referring to FIG. 1, the diffuser case 24 is exposed by removing portions of the gas turbine engine 10 located axially rearwardly thereof. In the particular example shown, the exhaust duct A, and the turbine exhaust case B are removed. The turbine section 18 is then removed, including low pressure turbine rotor C, low pressure vane D, high pressure turbine rotor E, turbine shroud case F and high pressure vane G. The fuel manifold H and combustor 16 are also removed. The diffuser ducts or pipes 26 are detached from the diffuser case 24. The diffuser case 24 is thus left exposed from the rear of the engine 10, while still being surrounded by the gas generator case 41, as shown in FIG. 6.

It is understood that different engine configurations may necessitate the removal of different and/or additional elements in order for the diffuser case 24 to be accessible and removable from the remainder of the engine 10.

Any fasteners connecting the diffuser case 24 to the remainder of the gas turbine engine 10, e.g. the outer shroud 36 of the compressor assembly 20 and the radial flange 39 of the outer case 41 for the example shown herein, are removed. Any fastener located in a hole not used for the installation and operation of the tool 50 can optionally remain in place until after the tool 50 is installed and ready to use.

Several of the tools 50 are installed in predetermined positions around a circumference of the diffuser case 24 in engagement therewith. For example, three (3) such tools 50 can be used, equally or substantially equally spaced apart along the circumference of the diffuser case 24 for improved stability. Each tool 50 is installed by engaging the positioning members 56*a*, 56*b* with the engaging elements 72 of the diffuser case 24 and/or the gas turbine engine 10, and by abutting each contact surface 64 with the corresponding exposed supporting surface 66 of the diffuser case 24. In the example shown, the contact surface 64 of each tool 50 is thus abutted against the radial or substantially radial supporting surface 66 of the diffuser ring 28, and each cylindrical pin 74*a*, 74*b* is inserted in the corresponding aligned holes of the diffuser case 24 and of the outer shroud 36.

The selected gripped portion 92 of the diffuser case 24 is gripped with each of the tools 50. In the example shown, the finger portions 78 are turned away from the diffuser ring 28 when the tool 50 is put in place. The diffuser ring 28 is then gripped by using the knobs 80 to pivot the finger portions 78 in engagement therewith, with the gripping surfaces 94 resting against the radial surface 96 of the diffuser ring 28 opposite the supporting surface 66.

Each of the tools 50 is used to push against the radial or substantially radial receiving surface 116 of the engine 10, which in the example shown is a surface of the radial portion 42 of the flange 38 of the compressor outer shroud 36. For each tool 50, the threaded rod 102 of the force member 58 is threaded into the base member 52 such that the foot portion 98 of the force member 58 pushes against the receiving surface 116 in an axial or substantially axial direction, thus pulling the diffuser case 24 away from a remainder of the gas turbine engine 10, until the diffuser case 24 is released. The tools 50 around the circumference of the diffuser case 24 prevent the same from falling by gravity while the diffuser case is being pulled out from the compressor shroud 36.

In a particular embodiment, heat is applied to the diffuser case 24 at the flange 30 while slowly turning the threaded rod 102 to minimize the risks of distortion of the flange 30 while the diffuser case 24 is pulled away from the compressor shroud 36.

The tool 50 or a plurality of the tools 50 can thus be used to remove the diffuser case 24 while the gas turbine engine 10 remains attached to the aircraft, e.g. connected to the wing thereof. The tools 50 thus permit on-wing removal of the diffuser case 24. Any fastener connecting the diffuser case 24 to the gas turbine engine 10 is removed, and the tools 50 are attached to the diffuser case 24 and/or gas turbine engine 10 as described above. As above, any fastener located in a hole not used for the installation and operation of the tool 50 can optionally remain in place until after the tool 50 is installed and ready to use. The tools 50 are use to produce a force pulling the diffuser case 24 away from the gas turbine engine 10 along an axial or substantially axial direction thereof, as described above, until the diffuser case 24 is free therefrom. All of these operations can be performed while the engine 10 remains attached to the aircraft.

The tool 50 thus allows for maintenance and/or repair of the diffuser 22 and/or of elements through removal the diffuser case 24 to be performed while the engine 10 remains attached to the aircraft, thus eliminating the need to remove the engine 10 and move it to a repair facility for such operations. This in turn reduces down time and maintenance and repair costs. The tool may be used, however, regardless of when the engine is on-wing, or has been removed from the aircraft.

The device may be useful with smaller gas turbine engines for which the diffuser case may be easily manipulated once removed, such as by hand or using light handling equipment, although the device may be used in any suitable context with any suitable engine design.

The above description is meant to be exemplary only, and one skilled in the art will recognize that changes may be made to the embodiments described without departing from the scope of the invention disclosed. For example, it is understood that the apparatus and method described herein may be used on an "on-wing" engine or an engine which has been removed from the aircraft. The number, configuration and nature of the gripping, positioning and/or pushing elements of the apparatus described may be modified in any suitable manner which falls within the mechanics of the method described, and may depend on the configuration of the turbofan engine concerned. Still other modifications which fall within the scope of the present invention will be apparent to those skilled in the art, in light of a review of this disclosure, and such modifications are intended to fall within the appended claims.

The invention claimed is:

1. A method of removing a centrifugal compressor diffuser case from a circumferential flange of a turbofan gas turbine engine case in which the diffuser case is mounted with an interference fit, the method comprising:
- removing at least one fastener connecting the diffuser case to the flange so that substantially only the interference fit joins the diffuser case to the flange;
- installing a plurality of tools around a periphery of the diffuser case;
- gripping a portion of the diffuser case with each of the tools; and then
- pushing axially against the flange with each of the tools with sufficient force to overcome the interference fit between the diffuser case and the flange and thereby axially move the diffuser case away from the flange.

2. The method as defined in claim 1, wherein installing the plurality of tools includes engaging positioning members of each of the tools with corresponding engaging elements of at least one of the diffuser case and the gas turbine engine.

3. The method as defined in claim 1, wherein gripping the portion of the diffuser case with each of the tools includes rotating gripping members of each of the tools to a position in engagement with the portion.

4. The method as defined in claim 1, wherein gripping the portion of the diffuser case with each of the tools includes gripping a ring of the diffuser case.

5. The method as defined in claim 1, wherein gripping the portion of the diffuser case with each of the tools includes gripping the portion between a base member of the tool and finger portions of the tool connected to the base member to be movable with respect thereto.

6. The method as defined in claim 1, wherein pushing includes rotating a threaded rod in threaded engagement with a base member of each of the tools such that a foot portion connected to the threaded rod and in contact with the surface of the gas turbine engine is displaced in the at least substantially axial direction.

7. A method of detaching a centrifugal compressor diffuser case from a turbofan gas turbine engine case in which the diffuser case is inserted with an interference fit, the method comprising:
- exposing the diffuser case while the gas turbine engine is attached to an aircraft, including removing through an aft portion of the engine case portions of the gas turbine engine located axially rearwardly of the diffuser case to thereby provide access to the diffuser case;
- removing at least one fastener connecting the diffuser case to the engine case so that substantially only the interference fit joins the diffuser case to the engine case;

installing a plurality of tools around a periphery of the diffuser case;

gripping a portion of the diffuser case with each of the tools; and then pushing axially against the engine case with each of the tools with sufficient force to overcome the interference fit between the diffuser case and the engine case and thereby axially move the diffuser case away from engine case.

8. The method as defined in claim 7, wherein producing a force with the tools against the surface of the gas turbine engine includes producing a force with the tools against an at least substantially radial surface of the gas turbine engine.

9. The method as defined in claim 7, wherein producing a force with the tools against the surface includes rotating a threaded rod in threaded engagement with a base member of each of the tools such that a foot portion connected to the threaded rod and in contact with the surface is displaced in the at least substantially axial direction.

10. The method as defined in claim 7, further including engaging positioning members of each of the tools with engaging elements of at least one of the diffuser case and the gas turbine engine prior to gripping the portion of the diffuser case with the plurality of tools.

11. The method as defined in claim 7, wherein gripping the portion of the diffuser case includes gripping a ring of the diffuser case with each of the tools.

12. The method as defined in claim 7, wherein gripping the portion of the diffuser case includes rotating gripping members of each of the tools to a position in engagement with the portion.

13. The method as defined in claim 7, wherein gripping the portion of the diffuser case includes gripping the portion between a base member of the tool and gripping members of the tool connected to the base member and movable with respect thereto.

14. The method as defined in claim 7, further comprising applying heat to a portion of the diffuser case engaged with the gas turbine engine with an interference fit while producing the force pulling the diffuser case.

* * * * *